UNITED STATES PATENT OFFICE 2,274,449

CHROMONES AND PROCESS FOR PRODUCING SAME

Walter John, Gottingen, and Philipp Günther, Kassel, Germany, assignors to Merck & Co. Inc., Rahway, N. J., a corporation of New Jersey No Drawing. Application May 12, 1939, Serial No. 273,368. In Germany May 14, 1938

4 Claims. (Cl. 260—333)

This invention relates to chromones and to processes for their production.

The chromones (i. e., chromanones and chromenes) are of interest in that they may be reduced to corresponding chromanes which are similar to α-tocopherol, the best known naturally occurring compound with vitamin E activity.

According to the present invention di- or trimethylhydroquinones are first converted into α- or γ-chromones which may be then reduced to the corresponding chromanes, for instance, by catalytic reduction or by treatment with zinc amalgam.

The chromanones may be produced by condensing di- or trimethylhydroquinone with acid chlorides of β,β-dialkyl-α,β-unsaturated acids, such as, for instance, β,β-dimethylacrylic acid chloride and the like.

As condensation agents may be employed phosphorus pentoxide and also aluminum chloride, phosphorus oxy chloride, zinc chloride, etc.

The following example is presented by way of illustration and not of limitation as to any obvious equivalent modifications which might be made therein without departing from the spirit and scope of the invention.

Example

About 5.75 gms. of β,β-dimethyl-acrylic acid chloride and 7.10 gms. of aluminum chloride are dissolved in 30 cc. of freshly distilled nitrobenzene and about 7.40 gms. of trimethylhydroquinone are added thereto under cooling. The reaction takes place at once with formation of hydrochloric acid. Immediately after the first vigorous reaction, the mixture is heated to 80° C. on the oil bath, whereby hydrochloric acid is still formed abundantly. After about 1½ hours the hydrochloric acid formation is completed. The mixture obtained is decomposed with about 400 gms. of ice and 50 cc. of concentrated hydrochloric acid. Immediately following, the nitrobenzene is removed by steam distillation. The residue is extracted with ether, the ethereal solution washed with 2N solution of caustic soda and then with water, dried with sodium sulfate and evaporated. About 5.4 gms. of a red-brown oil is obtained which is dissolved in benzene and passed through a column of aluminum oxide (according to Brockmann). The strongly red zone (I) is washed by adding benzene to the filtrate. The lowest light-brown zone (II) can be taken out and eluted, or washed by adding a large quantity of benzene to the filtrate. It contains the major part of the chromanone. The third, lighter zone contains high-melting materials. The upper zone contains strongly dark-brown colored substances. The material of zone II is dissolved in ether, the high-melting, slightly soluble residue is filtered off, the former is mixed with high boiling petroleum ether, the ether is evaporated as far as possible and the substance permitted to crystallize out slowly. The raw 2,2,5,7,8-pentamethyl-6-hydroxy-chromanone melts at about 158° C., and is recrystallized. It has the following structural formula:

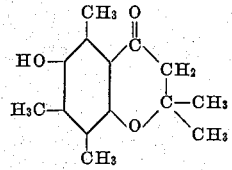

Finally, fine light-yellow crystalline needles are obtained, having a melting point of about 162° C. An analysis shows the composition $C_{14}H_{18}O_3$. The absorption maxima lie at 350 mμ and at 267 mμ. The yield is about 600 mg. From zone I further smaller quantities of chromanone can be obtained.

400 mg. of the chromanone are dissolved in about 5 cc. of hot methanol and about 10 cc. of hydrochloric acid (1:1) are added. This is boiled with amalgamated zinc while constantly passing hydrochloric acid gas. The solution at first has a dirty green-brown color but ultimately becomes colorless. After about 1½ hours the solution is strongly diluted with water and placed in the ice box for crystallization. About 200 mg. of 2,2,5,7,8-pentamethyl-6-hydroxy-chromane separate. It is recrystallized from methanol. It has a melting point of about 91° C. and has the following general structure:

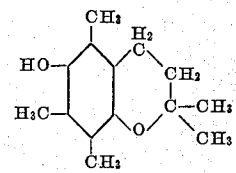

The analysis checks with the formula $C_{14}H_{20}O_2$; the compound possesses an absorption maximum at 293 mμ.

We claim:

1. In a process for the production of chromanones, the steps comprising adding trimethylhydroquinone to a solution of a β,β-dialkyl-α,β-unsaturated acid chloride and a compound selected from the group consisting of phosphorus pentoxide, aluminum chloride, phosphoxide, and zinc chloride in nitrobenzene, under cooling, and heating the mixture to about 80° C. until the reaction is completed.

2. Process comprising adding trimethylhydroquinone to a solution of a $\beta,\beta$-dialkyl-$\alpha,\beta$-unsaturated acid chloride and a compound selected from the group consisting of phosphorus pentoxide, aluminum chloride, phosphorus oxychloride, and zinc chloride in nitrobenzene, under cooling, heating the mixture to about 80° C. until the reaction is completed, and subsequently converting the chromanone obtained to the corresponding chromane by treatment with a substance selected from the group consisting of hydrogen and zinc amalgam.

3. In a process for the production of chromanones, the steps comprising adding trimethylhydroquinone to a solution of $\beta,\beta$-dimethylacrylic acid chloride and a compound selected from the group consisting of phosphorus pentoxide, aluminum chloride, phosphorus oxychloride, and zinc chloride in nitrobenzene, under cooling, and heating the mixture to about 80° C. until the reaction is completed.

4. Process comprising adding trimethylhydroquinone to a solution of $\beta,\beta$-dimethylacrylic acid chloride and a compound selected from the group consisting of phosphorus pentoxide, aluminum chloride, phosphorus oxychloride, and zinc chloride in nitrobenzene, under cooling, heating the mixture to about 80° C. until the reaction is completed, and subsequently converting the chromanone obtained to the corresponding chromane by treatment with a substance selected from the group consisting of hydrogen and zinc amalgam.

WALTER JOHN.
PHILIPP GÜNTHER.